United States Patent Office 3,840,559
Patented Oct. 8, 1974

3,840,559
2-METHYL-2-HEPTEN-6-ON-1-AL AND ACETALS THEREOF
Werner Hoffmann, Ludwigshafen, Germany, assignor to Badische Anilin- & Soda-Fabrik Aktiengesellschaft, Ludwigshafen (Rhine), Germany
No Drawing. Filed Feb. 22, 1972, Ser. No. 228,266
Claims priority, application Germany, Feb. 24, 1971, P 21 08 649.7
Int. Cl. C07d *13/04, 15/04*
U.S. Cl. 260—340.7                       2 Claims

ABSTRACT OF THE DISCLOSURE 2-methyl-2-hepten-6-on-1-al and acetals thereof and a method for the production of these compounds. The acetals are obtained by reacting the acetals of 2-methyl-4-halo-2-buten-1-al with an alkali compound of an ether of acetoacetic acid and eliminating, by means of an alkali, the alkoxycarbonyl group from the intermediate obtained. 2-methyl-2-hepten-6-on-1-al is obtained from the acetals by acid hydrolysis. The products are perfumes having a pleasant fruity odor and are intermediates for advantageous synthesis of the natural orange aromatics and orange odorants α-sinensal and β-sinensal.

The invention relates to 2-methyl-2-hepten-6-on-1-al and its acetals and to a process for the production of these compounds.

The compounds in question have the formula (I):

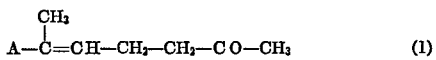
$$A-\overset{CH_3}{\underset{|}{C}}=CH-CH_2-CH_2-CO-CH_3 \quad (1)$$

in which A is

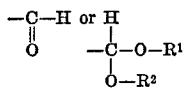

where $R^1$ and $R^2$ is each an aliphatic hydrocarbon radical of one to eight carbon atoms or $R^1$ and $R^2$ are alkylene of two to eight carbon atoms, cycloalkylene of five or six carbon atoms in the ring or o-phenylene.

I have found that the said compounds can be prepared in a simple way:

(a) By reacting an acetal of 2-methyl-4-halo-2-buten-1-al of the formula:

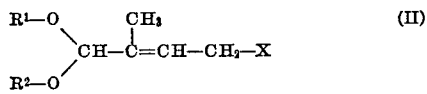

in which X is chlorine, bromine or iodine and $R^1$ and $R^2$ have the meanings given above, at a temperature of from 0° to 100° C. with an alkali metal compound of an acetoacetic ester of the formula (III):

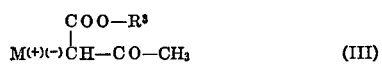

in which $R^3$ is a hydrocarbon radical of one to four carbon atoms and M is an alkali metal;

(b) Eliminating the COOR³ group from the resultant intermediate of the formula (IV):

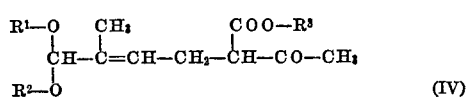

in which $R^1$, $R^2$ and $R^3$ have the meanings given above by alkaline treatment at a temperature of from 20° to 100° C.; and (c) In the case when A is

converting the acetal obtained according to step (b) into the 2-methyl-2-hepten-6-on-1-al by acid hydrolysis.

This synthesis proceeds smoothly with high yields.

The acetals of 2-methyl-4-halo-2-buten-1-al of the formula (II):

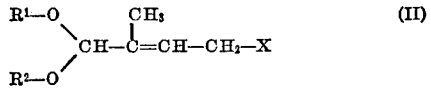

may be simple or cyclic acetals. Simple acetals are those in which $R^1$ and $R^2$ each is an aliphatic hydrocarbon radical such as methyl, ethyl, propyl, isopropyl, n-butyl, isobutyl, n-pentyl, n-hexyl or 2-ethylhexyl-1; $R^1$ and $R^2$ are preferably the same. Methyl and ethyl are particularly suitable as the aliphatic hydrocarbon radicals. Cyclic acetals, which are derived from diols, are particularly suitable. Examples are acetals derived from the following diols: ethylene glycol, 1,2-propanediol, 1,3-propanediol, 2,3-butanediol, 1,4-butanediol, 1,3-butanediol, 1,2-butanediol, 1,6-hexanediol, 1,2-cyclohexanediol and also pyrocatechol as an aromatic diol.

The cyclic acetals derived from ethylene glycol, 1,2-propanediol, 1,3-propanediol and 1,3-butanediol are preferably used.

The acetals of the formula (II) can be easily prepared by acetalization of 2-methyl-4-halo-2-butene which in turn is accessible by treatment of 1,1-dialkoxy-2-methyl-3-buten-2-aol with a thionyl halide or phosgene in the presence of a tertiary amine.

The alkali metal compound of an acetoacetic ester of the formula (III) used is conveniently an alkali metal derivative of an acetoacetic ester of a lower alcohol, i.e. the ester of an alcohol of one of four carbon atoms, particularly of one or two carbon atoms. Although the use of higher esters is possible it does not result in any appreciable advantage.

The alkali metal compounds of esters of acetoacetic acid are prepared by conventional methods, for example by reaction of an ester of acetoacetic acid with an alkali metal hydroxide or alcoholate at temperatures of from 0° to 50° C.

Preferred compounds of the formula (III) are the sodium and potassium compounds of methyl acetoacetate and ethyl acetoacetate.

The process according to the invention may be carried out in various ways.

Generally a solution or suspension of the alkali metal acetoacetic acid ester is prepared and about 0.9 to 1.2 moles of an acetal of the formula (II) is added per mole of ester at a temperature of from 0° to 100° C. preferably from 10° to 60° C. The reaction requires a reaction period of 0.5 to 15 hours. It may be carried out batchwise or continuously. Examples of solvents or suspending agents are: alcohols such as methanol, ethanol, propanol, butanol, isobutanol and glycol; or hydrocarbons such as benzene, cyclohexane, hexane and decahydronaphthalene. Ethers such as diethyl ether and tetrahydrofuran may however also be used as solvents. Alcohols, particularly methanol or ethanol, are however used as solvents with special advantage.

It is also possible however to introduced the alkali metal compound of an acetoacetic ester in powder form slowly and with intense mixing into the acetal of the formula (II). A period of from thirty minutes to five hours is necessary for the introduction of the alkali metal compound (III). The total reaction period is then from thirty minutes to fifteen hours.

The intermediates of the formula (IV) obtained in the reaction of the alkali compound (III) with the acetal (II) are new compounds. Some of their characteristic data are given in the experimental portion. They do not need to be isolated before they are processed into the desired acetals of 2-methyl-2-hepten-6-on-1-als.

To eliminate the alkoxycarbonyl groups it is advantageous to add to the reaction mixture obtained in the reaction of (II) with (III) an aqueous alkali metal hydroxide solution and to heat to mixture to a temperature of from 20° to 100° C., preferably from 30° to 80° C. Generally from 1 to 4 moles, preferably from 1 to 2 moles, of alkali metal hydroxide in from 5 to 20%, preferably about 10%, solution is used per mole of ester. The necessary reaction period for the elimination of the —COOR³ group is from thirty minutes to ten hours.

When an alcohol has not been used as a solvent in the production of the intermediate (IV) it is advisable to use a lower alcohol, for example methanol, as a solubilizer in the said elimination. The necessary amount approximately corresponds to the amount by weight of water present in the reaction mixture. It is surprising that the COOR³ group can be eliminated by alkaline treatment alone because usually an additional treatment with acids is necessary for such eliminations.

The acetals of 2-methyl-2-hepten-6-on-1-als can be isolated by conventional methods. It is advantageous to isolate them from the reaction mixture by extraction with a conventional extractant, for example with diethyl ether of hexane, drying of the organic phase followed by fractional distillation.

2-methyl-2-hepten-6-on-1-al itself can easily be prepared from the acetals by acid hydrolysis.

The acid hydrolysis is carried out by a conventional method. For example from 0.01 to 1 mole of a mineral acid or organic acid such as sulfuric acid, hydrochloric acid, formic acid, p-toluenesulfonic acid or acetic acid is added to each mole of acetal in the form of a 1 to 20% solution and the shole is heated for thirty minutes to five hours, preferably from two to three hours, at a temperature of from 10° to 50° C. with intense mixing.

The addition of a lower alcohol as solubilizer is also advisable in this hydrolysis. The ketoaldehyde can be isolated by conventional method, for example by extraction following mild neutralization of the reaction mixture, for example with an alkali metal or sodium carbonate followed by distillation of the extractant.

A number of interesting new compound are accessible for the first time by means of the said process. 2-methyl-2-hepten-6-on-1-al and its acetatals may be used as perfumes with a pleasant fruity odor note. Moreover they are suitable starting materials for the synthesis of the sinensals, desirable component of the natural orange aroma belonging to the terpene series.

The citrus odor of the parent substance 2-methyl-2-hepten-6-on-1-al is overlaid in the case of its acetals by a distinct green note (the odor of grass and hay). It is particularly strong in the case of the acetals derived from methanol, ethanol and glycol or their methyl substitution products. It is somewhat less pronounced in the case of the other products. Upon prolonged standing in the air, the odor of the parent substance predominates, because this is liberated by slow hydrolysis. This effect can be utilized reliably in the perfumery industry.

EXAMPLE 1

The following examples will illustrate the invention.
(A) 2-methyl-2-hepten-6-on-1-al-butylene-(1,3)-acetal:
(4-methyl-2-(2-hepten-6-on-2-yl)-1,3-dioxane)

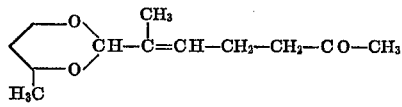

180 g. (1 mole) of 30% solution of sodium methylene in methanol is added over fifteen minutes at 15° to 20° C. to 116 g. (1 mole) of methyl acetoacetate. The whole is stirred for another hour at 20° to 30° C. and then 180 g. (0.95 mole) of 2-methyl-4-chloro-2-buten-1-al-butylene-(1,3)-acetal is added to the solution at 20° C. over thirty minutes. The reaction mixture obtained is stirred for fifteen hours at room temperature, then 400 g. of 10% caustic soda solution is added and stirring is continued for another two hours at 60° C. The salt-like constituents are separated by filtration and the organic products are isolated by extraction with ether. Before the ethereal solution is distilled it is washed with saturated common salt solution. The ether is then distilled off and the residue is fractionated. 178 g. of the acetal is obtained. This is equivalent to a yield of 84% of theory. The boiling point is 84° to 87° C. at 0.01 mm. and the refractive index $n_D^{25}=1.4682$.

(B) 2-methyl-2-hepten-6-on-1-al:
200 ml. of 10% sulfuric acid and 50 ml. of methanol are added to 106 g. (0.5 mole) of the acetal obtained according to (A) and stirred for three hours at 25° to 30° C. Neutralization is then carried out with sodium carbonate and the organic phase is isolated by extraction with ether. After the ether has been distilled off the residue is fractionated. 65 g. (93% yield) of 2-methyl-2-hepten-6-on-1-al is obtained. The boiling point is 130° to 140° C. at 20 to 23 mm. and the refractive index $n_D^{25}=1.4723$. Note resembling citrus. The odor of the acetals is similar but not so strong.

The following acetals are prepared analogously to Example 1:
2-methyl-2-hepten-6-on-1-al dimethylacetal:
Boiling point 72° to 83° C. at 0.9 to 1.5 mm.; $n_D^{25}=1.4474$.

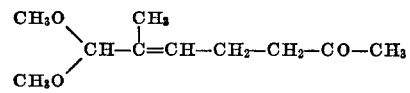

2-methyl-2-hepten-6-on-1-al diethylacetal:
Boiling point 74° to 75° C. at 0.15 mm.; $n_D^{25}=1.4442$.

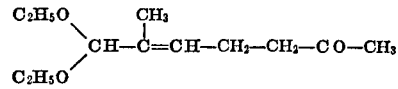

---

2-methyl-2-hepten-6-on-1-al propylene-(1,2)-acetal:
(4-methyl-2-(2-hepten-6-on-2-yl)-1,3-dioxolane)
Boiling point 85° to 88° C. at 0.55 mm.; $n_D^{25}=1.4630$.

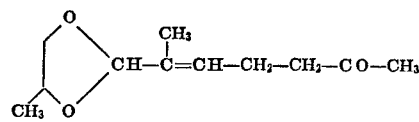

---

2-methyl-2-hepten-6-on-1-al butylene-(2,3)-acetal:
(4,5-dimethyl-2-(2-hepten-6-on-2-yl)-1,3-dioxolane)
Boiling point 92° to 96° C. at 0.6 mm.; $n_D^{25}=1.4601$.

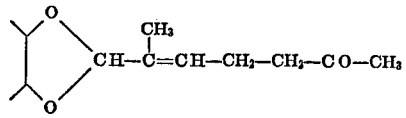

---

2-methyl-2-hepten-6-on-1-al propylene-(1,3)-acetal:
(2-(2-hepten-6-on-2-yl)-1,3-dioxane)
Boiling point 84° to 87° C. at 0.01 mm.; $n_D^{25}=1.4665$.

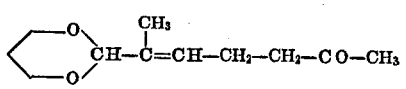

2-methyl-2-hepten-6-on-1-al (2-ethyl-1-hexyl)-bisacetal:

Boiling point 123° to 128° C. at 0.01 to 0.05 mm.; $n_D^{25}=1.4615$.

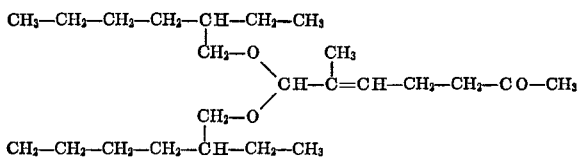

2-methyl-2-hepten-6-on-1-al o-phenylenacetal:

(2-(2-hepten-6-on-2-yl)-benzo-1,3-dioxolane)

Boiling point 131° to 135° C. at 0.05 to 0.1 mm.

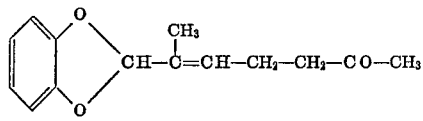

2-methyl-2-hepten - 6 - on-1-al cyclohexylene-(1,2)-acetal:

(4,5-tetramethylene-2-(2-hepten-6-on-2-yl)-1,3-dioxolane

Boiling point 128° to 136° C. at 0.08 to 1.0 mm.

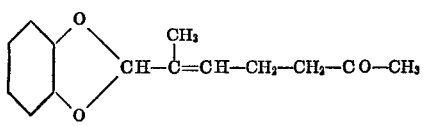

EXAMPLE 2

2-methyl-5-carbomethoxy-2-hepten-6-on-1-al butylene-(1,3)-acetal:

(4-methyl-2-(2-hepten-6-on-2-yl)-1,3-dioxane)

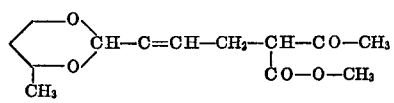

40 g. (1 mole) of sodium hydroxide is dissolved in 200 ml. of methanol and then 116 g. (1 mole) of methyl acetoacetate is added over thirty minutes at 45° to 55° C. Stirring is carried on for another hour at 20° to 55° C. and then 223 g. (0.95 mole) of 2-methyl-4-bromo-2-buten-1-al butylene-1,3-acetal is added at 25° to 37° C. over thirty minutes. The reaction mixture is then stirred for fifteen hours at room temperature. The methanol is distilled off in vacuo at 20° to 30° C. and the residue is extracted with 1 liter of ether. The ethereal solution is washed twice, each time with 100 ml. of saturated common salt solution. The ether is then distilled off and the residue is fractionated. 235 g. of the product is obtained (yield 87%). The boiling point is 132° to 133° C. at 0.05 mm.; $n_D^{25}=1.4718$.

The following intermediates are prepared analogously to Example 2:

2 - methyl-5-carbomethoxy-2-hepten-6-on-1-al dimethylacetal:

Boiling point 116° to 122° C. at 0.8 to 1.0 mm., $n_D^{25}=1.4514$.

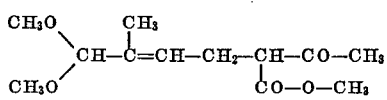

2-methyl - 5 - carboethoxy-2-hepten-6-on-1-al diethylacetal:

Boiling point 120° to 126° C. at 1 to 1.5 mm.; $n_D^{25}=1.4508$.

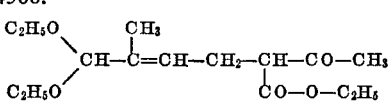

2-methyl - 5 -carbo-tert.-butoxy-2-hepten-6-on-1-al dimethylacetal:

Boiling point 125° to 131° C. at 0.5 to 0.8 mm.; $n_D^{25}=1.4516$.

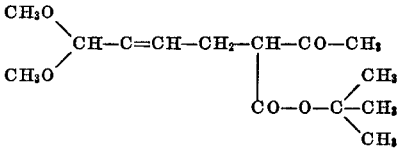

I claim:
1. A compound of the formula (I):

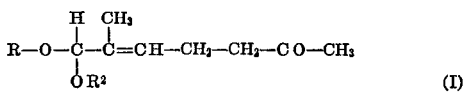

where $R^1$ and $R^2$ together are a 1,2- or 1,3-alkylene group of two to eight carbon atoms.

2. The compound of the formula:

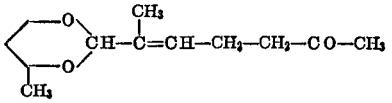

References Cited

UNITED STATES PATENTS 2,816,117  12/1957  Cawley _____ 260—340.9

DONALD G. DAUS, Primary Examiner

J. H. TURNIPSEED, Assistant Examiner

U.S. Cl. X.R.

260—338, 340.5, 340.9, 483, 593, 594; 252—522